US010603624B2

(12) United States Patent
Mengel et al.

(10) Patent No.: US 10,603,624 B2
(45) Date of Patent: Mar. 31, 2020

(54) WET FLUE GAS DESULFURIZATION PROCESS AND APPARATUS

(71) Applicant: Marsulex Environmental Technologies Corporation, Lebanon, PA (US)

(72) Inventors: Michael Lyn Mengel, Fredericksburg, PA (US); Amy P. Evans, Harrisburg, PA (US)

(73) Assignee: Marsulex Environmental Technologies Corporation, Lebanon, PA (US)

( * ) Notice: Subject to any disclaimer, the term of this patent is extended or adjusted under 35 U.S.C. 154(b) by 0 days.

(21) Appl. No.: 16/019,838

(22) Filed: Jun. 27, 2018

(65) Prior Publication Data

US 2019/0001257 A1   Jan. 3, 2019

Related U.S. Application Data

(60) Provisional application No. 62/528,239, filed on Jul. 3, 2017.

(51) Int. Cl.
 *B01D 53/14* (2006.01)
 *B01D 53/50* (2006.01)
 (Continued)

(52) U.S. Cl.
 CPC ..... *B01D 53/1425* (2013.01); *B01D 53/1481* (2013.01); *B01D 53/1493* (2013.01);
 (Continued)

(58) Field of Classification Search
 None
 See application file for complete search history.

(56) References Cited

U.S. PATENT DOCUMENTS

| 4,690,807 A | 9/1987 | Saleem |
| 5,362,458 A | 11/1994 | Saleem et al. |

(Continued)

FOREIGN PATENT DOCUMENTS

| CN | 101797466 | 5/2012 |
| CN | 105435618 | 3/2016 |

(Continued)

OTHER PUBLICATIONS

Ekato Industrieanlagen. JP05-033087B2-translated document (Year: 1993).*

(Continued)

*Primary Examiner* — Walter D. Griffin
*Assistant Examiner* — Jelitza M Perez
(74) *Attorney, Agent, or Firm* — Hartman Global IP Law; Gary M. Hartman; Domenica N. S. Hartman

(57) ABSTRACT

Systems, apparatuses, and processes for controlling free ammonia in wet flue gas desulfurization processes in which an ammonia-containing scrubbing solution is used to produce ammonium sulfate. Such an apparatus includes an absorber having a contactor region through which a flue gas comprising sulfur dioxide is able to flow and a reaction tank containing a scrubbing solution containing ammonium sulfate. The tank has a sidewall and bottom wall that define the perimeter and bottom of the tank. Lance-agitator units are distributed around the perimeter of the tank, each having a lance that injects a mixture of oxygen and a dilute ammonia-containing fluid toward the bottom of the tank and an agitator that agitates the mixture and propels the mixture toward the bottom of the tank. The apparatus includes a source of the mixture of oxygen and dilute ammonia-containing fluid, and recirculates the scrubbing solution from the tank to the contactor region.

8 Claims, 4 Drawing Sheets

(51) Int. Cl.
  *B01D 53/18* (2006.01)
  *B01J 8/26* (2006.01)
(52) U.S. Cl.
  CPC .......... *B01D 53/18* (2013.01); *B01D 53/502* (2013.01); *B01D 53/504* (2013.01); *B01J 8/26* (2013.01); *B01D 2251/102* (2013.01); *B01D 2251/206* (2013.01); *B01D 2251/608* (2013.01); *B01D 2252/102* (2013.01); *B01D 2257/2045* (2013.01); *B01D 2257/2047* (2013.01); *B01D 2257/302* (2013.01); *B01D 2258/0283* (2013.01)

(56) References Cited

U.S. PATENT DOCUMENTS

| | | |
|---|---|---|
| 6,187,278 B1 | 2/2001 | Brown et al. |
| 6,277,343 B1 | 8/2001 | Gansley et al. |
| 7,771,685 B2 | 8/2010 | Gal |
| 9,327,234 B2 | 5/2016 | Gal |
| 2007/0063359 A1 | 3/2007 | Dowd et al. |

FOREIGN PATENT DOCUMENTS

| | | | | |
|---|---|---|---|---|
| CN | 106310913 | | 1/2017 | |
| GB | 2164576 | A * | 3/1986 | .......... B01F 3/04588 |
| JP | 05033087 | B2 * | 1/1993 | |

OTHER PUBLICATIONS

International Search Report and Written Opinion for International Application No. PCT/US2018/040221, dated Nov. 15, 2018.

* cited by examiner

WET FLUE GAS DESULFURIZATION PROCESS AND APPARATUS

CROSS REFERENCE TO RELATED APPLICATIONS

This application claims the benefit of U.S. Provisional Application No. 62/528,239, filed Jul. 3, 2017, the contents of which are incorporated herein by reference.

BACKGROUND OF THE INVENTION

The present invention generally relates to systems, apparatuses, and processes for removing acidic gases from gas streams, including but not limited to utility and industrial flue gases. The invention particularly relates to the control of free ammonia and ammonium sulfate aerosol in wet flue gas desulfurization processes and apparatuses in which an ammonia-containing scrubbing solution is used to produce ammonium sulfate as a byproduct.

Gas-liquid contactors and absorbers are widely used to remove substances such as gases and particulate matter from flue gases produced by utility and industrial plants. Often of particular concern are sulfur dioxide ($SO_2$) and other acidic gases produced by the combustion of fossil fuels and various industrial operations. These gases are known to be hazardous to the environment and their emission into the atmosphere is closely regulated by clean air statutes. The method by which these gases are removed with a gas-liquid contactor or absorber is commonly referred to as wet flue gas desulfurization (WFGD).

The cleansing action produced by gas-liquid contactors and absorbers is generally derived from the passage of gas through a tower cocurrently or countercurrently to a descending liquid that absorbs the targeted gas(es) and particulate matter. Wet flue gas desulfurization processes have typically involved the use of an alkaline scrubbing liquid, such as a calcium-based slurry or a sodium-based or ammonia-based solution. While effective, gas-liquid contactors and absorbers utilizing calcium-based slurries produce large quantities of wastes or gypsum, the latter having only nominal commercial value. In contrast, ammonia-based scrubbing processes have been used in the art to produce a more valuable ammonium sulfate byproduct that is usable as a fertilizer. In these processes, sulfur dioxide is absorbed from flue gases with an ammonium sulfate solution, after which the sulfur dioxide is reacted with oxygen and anhydrous or aqueous ammonia injected into the solution to form additional ammonium sulfate solution or ammonium sulfate crystals (($NH_4)_2SO_4$). Particular examples of such processes are disclosed in U.S. Pat. Nos. 4,690,807, 5,362,458, 6,187,278, 6,277,343, 7,771,685, and 9,327,234. In addition to being required to react with sulfur dioxide to produce ammonium sulfate, ammonia also serves to increase the efficiency of sulfur dioxide removal by reducing the acidity of the ammonium sulfate solution, which becomes more acidic with the absorption of sulfur dioxide.

The use and addition of anhydrous or aqueous ammonia to control sulfur oxide gases can result in undesirable levels of ammonia slip. As used herein, ammonia slip refers to free ammonia (anhydrous ammonia, $NH_3$) entrained in a scrubbed flue gas exiting a gas contactor or absorber. In addition to incurring an economic loss because of lost ammonia, free ammonia in the scrubbed flue gas reacts with uncaptured sulfur dioxide and trioxide to create an ammonium sulfate aerosol that may be visible as a blue or white plume in the stack discharge, leading to secondary pollution problems. Controlling the amount of free ammonia in the desulfurization process is in part a function of the ammonia vapor pressure, which results from a combination of pH and levels of unoxidized ammonium sulfite produced by the reaction of sulfur dioxide and ammonia in the absence of sufficient oxygen. High pH values result in high ammonia vapor pressure, which promotes ammonia slip. High levels of unoxidized ammonium sulfite also promote ammonia slip.

FIGS. 1 and 2 schematically represent a flue gas scrubbing apparatus 10 that is disclosed in U.S. Pat. No. 6,187,278 as effective to reduce ammonia slip. As shown, the apparatus 10 includes an upright absorber 12 that is supplied with flue gas through an inlet duct 14. The apparatus 10 operates in a manner that causes absorption of sulfur dioxide from the flue gas using a scrubbing liquid. The scrubbed flue gas that leaves the absorber 12 can be delivered to a stack (not shown) or other suitable equipment through an outlet duct 20. The source of the flue gas may be any process involving the combustion of fossil fuels or various industrial operations in which undesirable gases or particulate matter are produced.

U.S. Pat. No. 6,187,278 discloses the apparatus 10 as utilizing an ammonia-rich scrubbing solution 22, such as an aqueous ammonium sulfate solution containing free dissolved ammonia as the reagent for the desulfurization process. FIG. 1 shows ammonia ($NH_3$) being delivered from a source 32 to a reaction tank 18 via a pump 26, conduit 28, and injection system 30 that comprises multiple spargers 34 that extend across the entire diameter of the tank 18. A recirculation pump 40 serves to recycle the scrubbing solution 22 from the tank 18 through a conduit 16 to a contactor region of the absorber 12, where the solution 22 is introduced through a number of nozzles 24 or other suitable devices. The scrubbing process involves spraying the scrubbing solution 22 into the absorber 12 so as to provide intimate contact between the solution 22 and the flue gas. As a result, the solution 22 absorbs sulfur dioxide and other acid gases, such as hydrogen chloride (HCl) and hydrogen fluoride (HF), if they are present in the flue gas. The solution 22 then falls into the reaction tank 18, where the absorbed sulfur dioxide reacts with the ammonia and is oxidized to form ammonium sulfate. Specifically, sulfur dioxide reacts with ammonia to form ammonium sulfite (($NH_4)_2SO_3$) and ammonium bisulfite ($NH_4HSO_3$), which are oxidized in the presence of sufficient oxygen to form ammonium sulfate and ammonium bisulfate ($NH_4HSO_4$), the latter of which reacts with ammonia to form additional ammonium sulfate. A portion of the scrubbing solution 22 and/or ammonium sulfate crystals that form in the solution 22 can then be drawn off to yield the desired byproduct of this reaction. A sufficient amount of ammonium sulfate may be removed from the scrubbing solution 22 prior to delivery to the absorber 12 in order to maintain ammonium sulfate at a desired concentration in the solution 22.

U.S. Pat. No. 6,187,278 teaches that the manner in which ammonia is injected may promote high levels of ammonia slip, such that ammonia and possibly ammonium sulfate aerosol are discharged into the atmosphere with the scrubbed flue gas exiting the absorber 12. As a solution to this problem, U.S. Pat. No. 6,187,278 injects ammonia into the scrubbing solution 22 in the reaction tank 18 in a dilute form (for example, a dilute aqueous solution) and through the spargers 34 shown in FIGS. 1 and 2, which uniformly disperse the dilute ammonia in the scrubbing solution 22 to reduce the likelihood that pockets of high pH and high ammonium sulfite levels will be present in the scrubbing solution 22, such that more uniform and desirable pH and ammonium sulfite levels are achieved that promote absorption of ammonia and control ammonia slip in the absorber 12. As represented in FIG. 1, the ammonia injected into the scrubbing solution 22 is diluted with oxygen from a suitable source 38, and the resulting mixture is then delivered to the tank 18 via the spargers 34 of the injection system 30. Circulation of the injected ammonia and oxygen in the reaction tank 18 is shown in FIG. 1 as promoted by a fan 42.

BRIEF DESCRIPTION OF THE INVENTION

The present invention provides systems, apparatuses, and processes suitable for controlling free ammonia in wet flue gas desulfurization processes and apparatuses in which an ammonia-containing scrubbing solution is used to produce ammonium sulfate.

According to one aspect of the invention, an apparatus for removing sulfur dioxide from a flue gas includes an absorber having a contactor region through which a flue gas comprising sulfur dioxide is able to flow and a reaction tank containing a scrubbing solution comprising ammonium sulfate. The tank has a sidewall that defines a perimeter of the tank and a bottom wall that defines a bottom of the tank. A plurality of lance-agitator units are distributed around the perimeter of the tank. Each lance-agitator unit comprises a lance that injects a mixture of oxygen and a dilute ammonia-containing fluid toward the bottom of the tank and an agitator that agitates the mixture and propels the mixture toward the bottom of the tank. The apparatus further includes a source of the mixture of oxygen and dilute ammonia-containing fluid, and means for recirculating the scrubbing solution from the tank to the contactor region.

According to another aspect of the invention, a process for removing sulfur dioxide from a flue gas includes delivering the flue gas to a contactor region of an absorber, contacting the flue gas within the contactor region with a scrubbing solution that contains ammonium sulfate to absorb sulfur dioxide from the flue gas, and accumulating the scrubbing solution containing the absorbed sulfur dioxide in a tank having a bottom wall and a side wall that defines a perimeter of the tank. A plurality of lance-agitator units is distributed around the perimeter of the tank to introduce a mixture of oxygen and a dilute ammonia-containing fluid into the tank to react with the sulfur dioxide to produce ammonium sulfate. Each lance-agitator unit comprises a lance that injects the mixture toward the bottom of the tank and an agitator that agitates the mixture and propels the mixture toward the bottom of the tank. The scrubbing solution is recirculated from the tank to the contactor region.

Technical aspects of the processes and apparatuses described above preferably include the ability to generate ammonium sulfate while controlling ammonia slip through the combined use of multiple lances and agitators, which have been shown to be effective and offer advantages over prior art sparger systems.

Other aspects and advantages of this invention will be further appreciated from the following detailed description.

DETAILED DESCRIPTION OF THE INVENTION

The invention relates to flue gas desulfurization processes and apparatuses suitable for removing sulfur dioxide gas entrained in flue gases to generate ammonium sulfate as a byproduct. While the invention will be described in reference to a desulfurization system that utilizes an absorber, those skilled in the art will recognize that the teachings of this invention can be readily applied to various other desulfurization systems, and the desulfurization process is compatible with various systems capable of removing other undesirable gases, mist, dust, fumes, smoke and/or particulate matter from a stream of gas.

Figure 3:
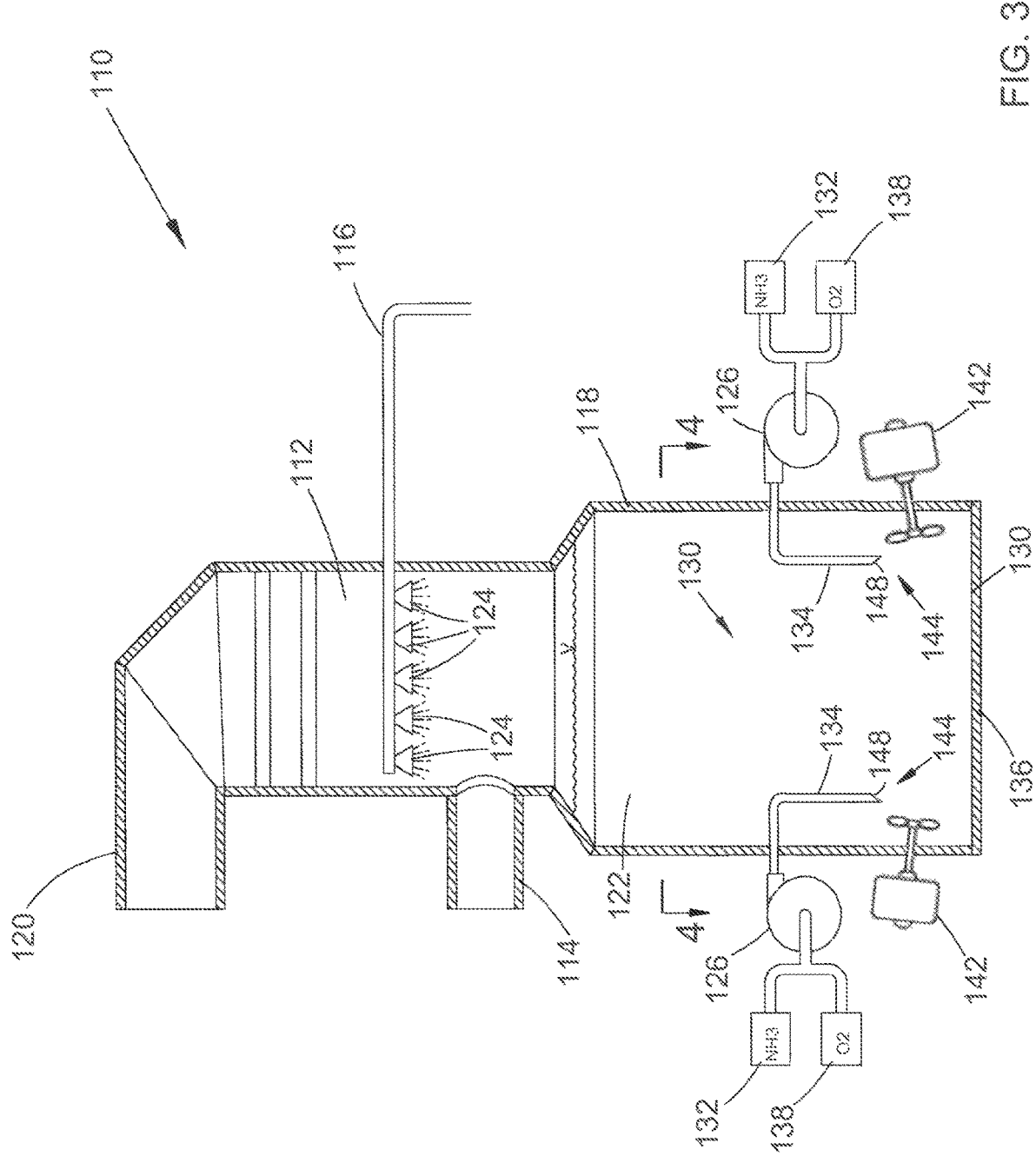
FIG. 3 is a schematic representation of an apparatus for a flue gas desulfurization process in accordance with a nonlimiting aspect of the present invention.

FIG. 3 is a schematic view of a flue gas scrubbing apparatus 110 in accordance with a nonlimiting embodiment of the invention. As shown, the apparatus 110 includes an upright absorber 112 that is supplied with a flue gas through an inlet duct 114. The apparatus 110 operates in a manner that causes absorption of sulfur dioxide from the flue gas through the use of a scrubbing solution 122. The scrubbed flue gas exits the absorber 112 through an outlet duct 120 and from there may be delivered to a stack (not shown) or other suitable equipment. The source of the flue gas may be any process involving the combustion of fossil fuels or various industrial operations by which undesirable gases or particulate matter are produced.

The scrubbing solution 122 is an ammonia-rich scrubbing solution, and in particular a scrubbing solution containing free dissolved ammonia as the reagent for the desulfurization process. The dissolved ammonia can be either aqueous ammonia (ammonium hydroxide) or anhydrous ammonia ($NH_3$), depending on the composition of the scrubbing solution. As nonlimiting examples, the solution may contain ammonia diluted with air and/or water, with the latter resulting in the presence of aqueous ammonia. FIG. 3 shows ammonia being delivered from a source 132 to a reaction tank 118 via a pump 126 and an injection system 130. The ammonia, which may be present in an aqueous solution or other suitable solution as noted above, is a primary reactant when producing ammonium sulfate as a byproduct of the desulfurization process, and the scrubbing solution 122 serves as the vehicle for delivering the ammonia to the absorber 112.

Figure 1:
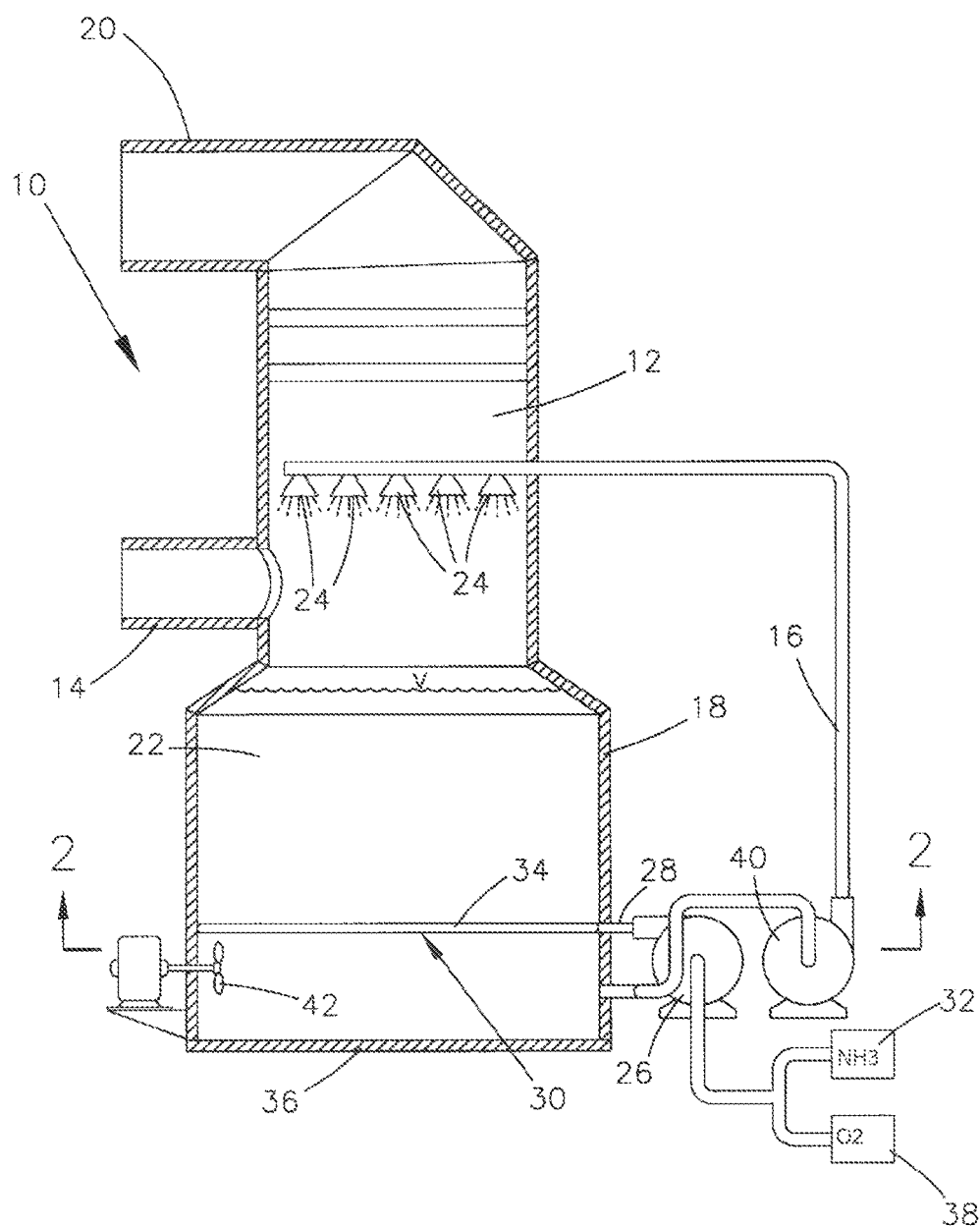
FIG. 1 is a schematic representation of an apparatus for a flue gas desulfurization process.

Similar to the apparatus 10 of FIG. 1, one or more recirculation pumps 140 (FIG. 4) may be used to recycle the scrubbing solution 122 from the tank 118 through a conduit 116 to a contactor region of the absorber 112, where the solution 122 is introduced through a number of nozzles 124 or other suitable devices. The scrubbing process involves spraying the scrubbing solution 122 into the absorber 112 so as to provide intimate contact between the solution 122 and the flue gas. As a result, the solution 122 absorbs sulfur dioxide and potentially other acid gases, such as hydrogen chloride and hydrogen fluoride, if present in the flue gas. The solution 122 then falls into the reaction tank 118, where the absorbed sulfur dioxide reacts with the ammonia to form ammonium sulfite and ammonium bisulfite, which are then oxidized in the presence of sufficient oxygen to form ammonium sulfate and ammonium bisulfate, the latter of which reacts with ammonia to form additional ammonium sulfate.

A portion of the scrubbing solution 122 and/or ammonium sulfate crystals that form in the solution 122 may be drawn off to yield a desired fertilizer byproduct of this reaction. A sufficient amount of ammonium sulfate is preferably removed from the scrubbing solution 122 prior to delivery to the absorber 112 in order to maintain ammonium sulfate at a desired concentration in the solution 122, as a nonlimiting example, about 2% up to the saturation level of ammonium sulfate in the solution 122.

Figure 2:
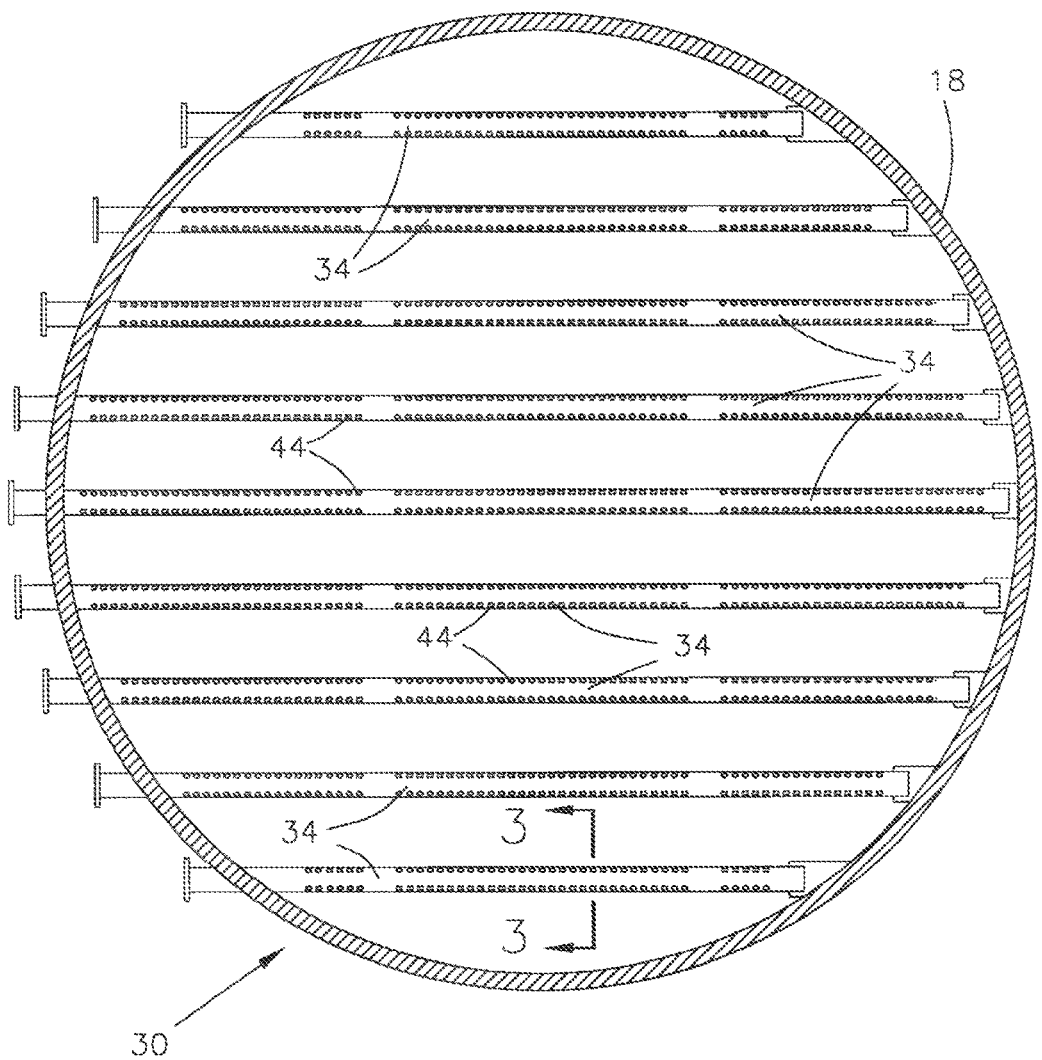
FIG. 2 is a cross-sectional view of the apparatus of FIG. 1 along section line 2-2.

Sufficient ammonia is preferably delivered to the tank 118 to control the pH of the scrubbing solution 122, for example, within a typical range of about 4 to 6 pH range, such that the solution 122 is highly reactive for high efficient capture of sulfur oxide gases. The manner in which the ammonia is injected into the solution 122 can undesirably promote high levels of ammonia slip, such that free ammonia and potentially an ammonium sulfate aerosol escapes the absorber 112 and is discharged into the atmosphere. Whereas U.S. Pat. No. 6,187,278 seeks to reduce ammonia slip by injecting dilute ammonia into a scrubbing solution with an injection system that comprises multiple spargers that extend in parallel across the entire diameter of the reaction tank (FIGS. 1 and 2), a substantial test program leading up to the present invention indicated that combinations of lances and agitators selectively located around the perimeter of a reaction tank are capable of having a comparable effect with respect to oxygen transfer and uniformly dispersing a dilute mixture of ammonia and oxygen in the reaction tank.

Figure 4:
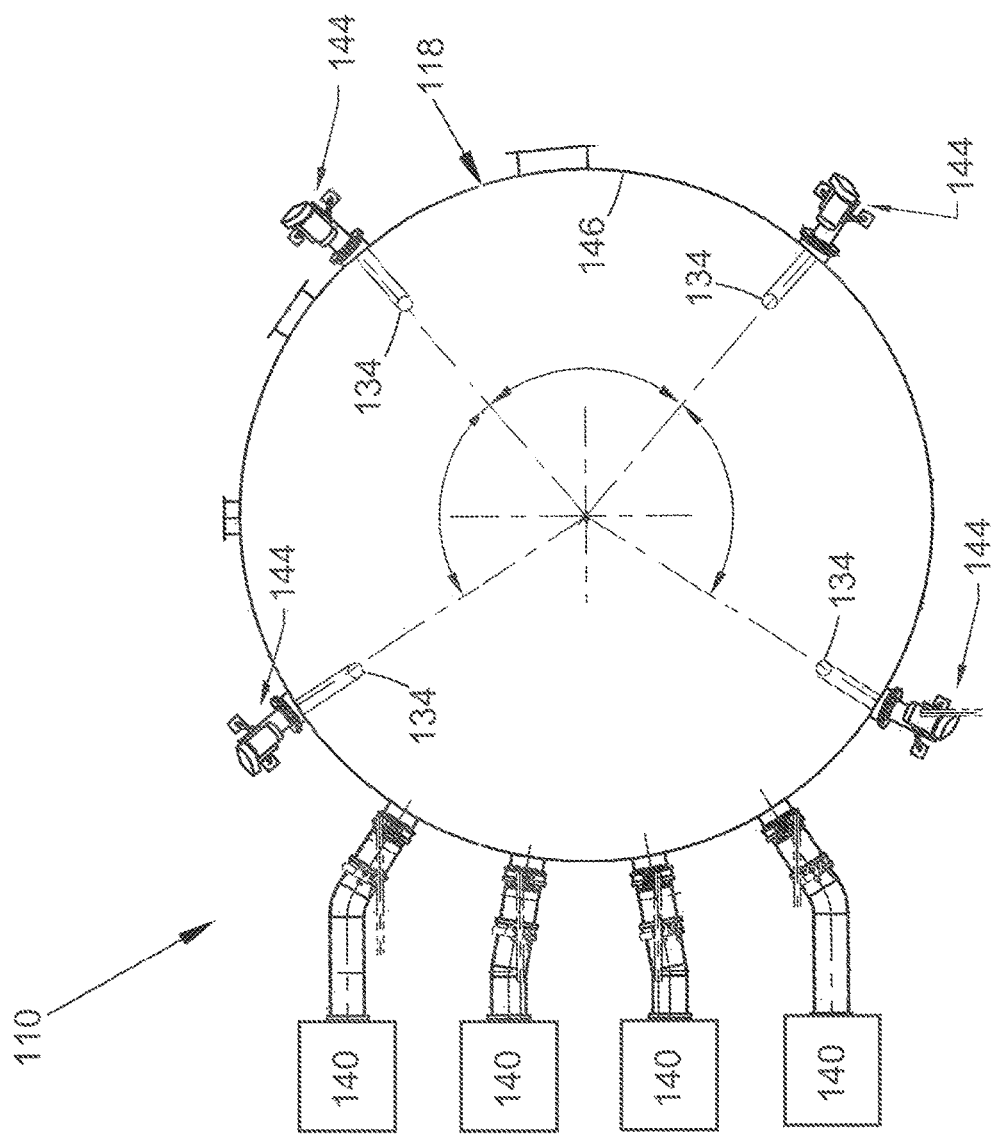
FIG. 4 is a cross-sectional view of the apparatus of FIG. 3 along section line 4-4.

The ammonia injected from the source 132 in the reaction tank 118 is preferably in the form of a dilute solution, for example, an aqueous solution. FIGS. 3 and 4 represent the diluted ammonia solution as being further diluted with oxygen from a suitable source 138 prior to being injected into the tank 118 via lances 134 of the injection system 130. Air is a suitable source for the oxygen, with a preferred ammonia:air weight ratio being about 1 to about 5. As seen in FIG. 3, each lance 134 is paired with an agitator 142 that operates in combination with its associated lance 134 to uniformly disperse the injected mixture of oxygen and dilute ammonia toward the bottom 136 of the reaction tank 118. Each lance 134 is represented in FIG. 3 as comprising a pipe that extends through a sidewall of the tank 118, has a section that projects vertically downward toward the tank bottom 136, and terminates with an outlet 148 facing the tank bottom 136. Each agitator 142 is represented in FIG. 3 as comprising a propeller or fan mounted on a shaft that extends through the tank sidewall at a negative angle to horizontal and is driven by a motor. Each lance 134 injects the ammonia toward the bottom 136 of the tank 118, and its paired agitator 142 assists to propel and disperse the injected ammonia at the tank bottom 136. The negative angle of the shaft is preferably sufficient to promote the downward flow of the injected oxygen-ammonia mixture toward the tank bottom 136, with suitable angles believed to be at least eight to about twelve degrees from horizontal.

FIG. 4 represents the tank 118 as equipped with four lance/agitator units 144, each having a single lance 134 paired with a single agitator 142. As represented in FIG. 4, the units 144 are generally equi-angularly distributed around the interior perimeter 146 defined by the sidewall of the tank 118. Based on a reaction tank 118 having a depth of about 48 feet (about 14 meters), the outlet 148 of each lance 134 is preferably located about 4 to about 8 feet (about 1.2 to about 2.4 meters) from the bottom 136 of the tank 118, and agitation caused by each agitator 142 preferably occurs between the lance outlet 148 and the tank bottom 136. This arrangement has been shown to achieve acceptable results in terms of delivering sufficient ammonia and oxygen while simultaneously avoiding ammonia slip. The ammonia and oxygen mixture introduced with the injection system 130 is forcibly circulated through the reaction tank 118 by the agitators 142, as opposed to relying on natural circulation cause by the solution 122 being recirculated from the tank 118 to the absorber 112.

A significant advantage of the present invention is the ability to use lances instead of more expensive spargers to reduce ammonia slip in a desulfurization process that uses an ammonia-based scrubbing solution. Other advantages include minimal pluggage potential, fewer penetrations, and fewer obstructions in the reaction tank.

While the invention has been described in terms of a specific or particular embodiment, it should be apparent that alternatives could be adopted by one skilled in the art. For example, the flue gas scrubbing apparatus 110 and its components could differ in appearance and construction from the embodiment described herein and shown in the drawings, functions of certain components of the apparatus 110 could be performed by components of different construction but capable of a similar (though not necessarily equivalent) function, various process parameters could be employed, and various materials could be used in the fabrication of the apparatus 110 and/or its components. In addition, the invention encompasses additional or alternative embodiments in which one or more features or aspects of the disclosed embodiment could be eliminated. Accordingly, it should be understood that the invention is not necessarily limited to any embodiment described herein or illustrated in the drawings. It should also be understood that the phraseology and terminology employed above are for the purpose of describing the illustrated embodiment, and do not necessarily serve as limitations to the scope of the invention. Therefore, the scope of the invention is to be limited only by the following claims.

The invention claimed is:

1. An apparatus for removing sulfur dioxide from a flue gas using an ammonia-based scrubbing solution, the apparatus comprising:
    an absorber having a contactor region through which a flue gas comprising sulfur dioxide is able to flow and a reaction tank containing the scrubbing solution comprising ammonium sulfate, the tank having a side wall that defines a perimeter of the tank and a bottom wall that defines a bottom of the tank;
    a plurality of lance-agitator units distributed around the perimeter of the tank, each of the lance-agitator units comprising a lance that injects a mixture of oxygen and a dilute ammonia-containing fluid through outlets located about 1.2 to about 2.4 meters from the bottom of the tank and injects the mixture toward the bottom of the tank to convert ammonium sulfite to ammonium sulfate, each of the lance-agitator units further comprising an agitator that agitates the mixture and propels the mixture toward the bottom of the tank to reduce ammonia slip from the scrubbing solution in the tank;
    a source of the mixture of oxygen and dilute ammonia-containing fluid; and
    means for recirculating the scrubbing solution from the tank to the contactor region to remove sulfur dioxide from the flue gas.

2. The apparatus according to claim 1, wherein the source of the oxygen in the mixture is air.

3. The apparatus according to claim 1, wherein the dilute ammonia-containing fluid of the mixture is an aqueous ammonia solution or a solution containing anhydrous ammonia.

4. A process for removing sulfur dioxide from a flue gas using the apparatus according to claim 1, the method comprising the steps of:
- delivering the flue gas to the contactor region of the absorber;
- contacting the flue gas within the contactor region with the scrubbing solution that contains the ammonium sulfate to absorb sulfur dioxide from the flue gas;
- accumulating the scrubbing solution containing the absorbed sulfur dioxide in the tank;
- utilizing the plurality of lance-agitator units distributed around the perimeter of the tank to introduce the mixture of oxygen and the dilute ammonia-containing fluid into the tank to react with the sulfur dioxide to produce ammonium sulfate, wherein the lance of each of the lance-agitator units injects the mixture toward the bottom of the tank and the agitator agitates the mixture and propels the mixture toward the bottom of the tank; and
- recirculating the scrubbing solution from the tank to the contactor region.

5. The process according to claim 4, wherein the source of the oxygen in the mixture is air.

6. The process according to claim 4, wherein the dilute ammonia-containing fluid of the mixture is an aqueous ammonia solution or a solution containing anhydrous ammonia.

7. The apparatus according to claim 1, wherein the lance-agitator units are equi-angularly distributed around the perimeter defined by the sidewall of the tank.

8. The apparatus according to claim 1, wherein the agitators are arranged to agitate the mixture between the outlets of the lances and the bottom of the tank.

\* \* \* \* \*